Oct. 12, 1943.   A. H. BITNER   2,331,760
ELECTRIC DRILLING, CAULKING, CHIPPING, AND RIVETING TOOL
Filed March 12, 1942
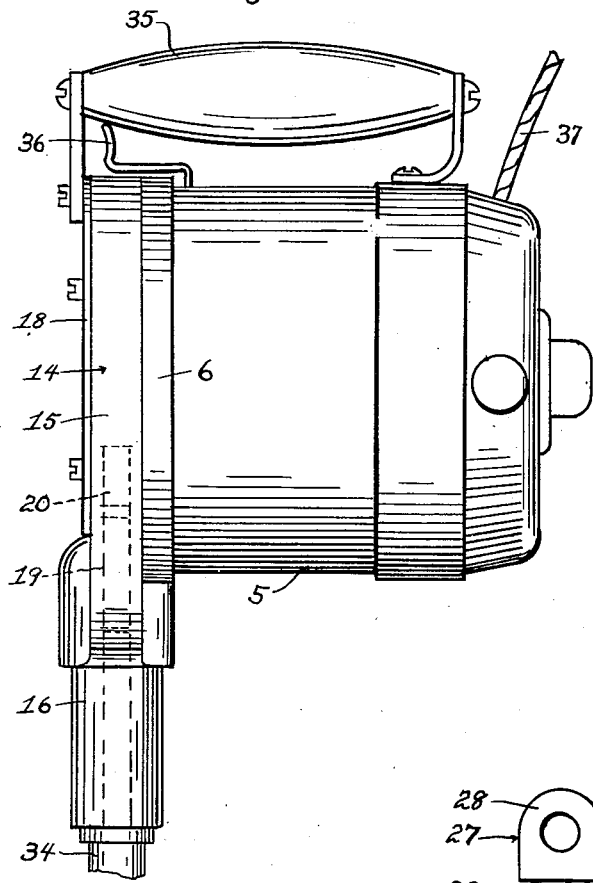
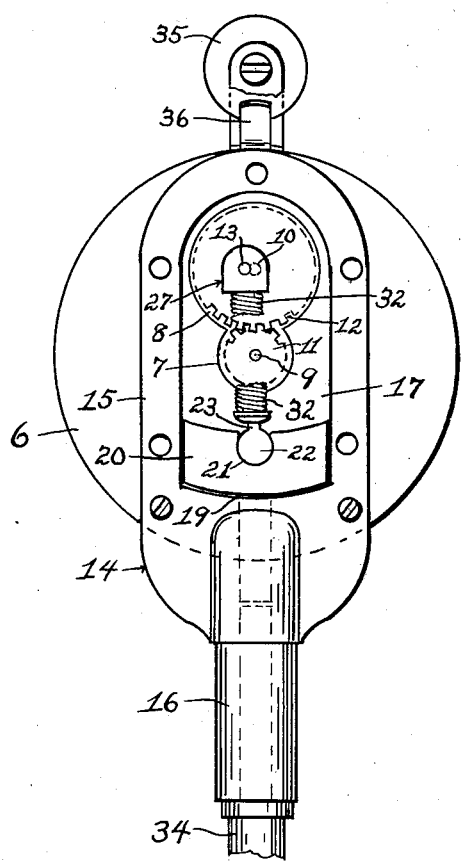
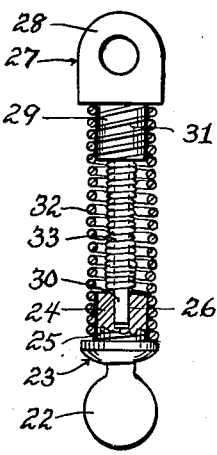
INVENTOR.
Abram H. Bitner
BY W. W. Williamson
Atty.

Patented Oct. 12, 1943

2,331,760

UNITED STATES PATENT OFFICE 2,331,760

ELECTRIC DRILLING, CALKING, CHIPPING, AND RIVETING TOOL

Abram H. Bitner, Philadelphia, Pa., assignor of one-half to Joseph Pentony, Philadelphia, Pa.

Application March 12, 1942, Serial No. 434,368

4 Claims. (Cl. 74—582)

My invention relates to new and useful improvements in an electric drilling, calking, chipping and riveting tool and may be used for any purpose where the working implement can be caused to function by blows from a reciprocating piston.

An object of this invention is to provide an electrically operated tool which will be light in weight although strong and durable, and capable of being readily and easily carried from place to place.

Another object of this invention is to construct a resilient connecting rod of two concentric coil springs, the outer and stronger one of which is of the contractile type while the inner and weaker one is of the extensile type.

Still another object of the invention is to provide, in a tool of the kind mentioned, a connecting rod consisting of two coil springs, one enclosed within the other, both functioning to transmit power and motion from a driving mechanism to a driven element with a minimum shock to the driving mechanism.

A further object of the present invention is to provide a connecting rod including a knuckle member having a bore, a bearing member carrying a pilot bar having a portion projecting into the bore for sliding movement, a contractile outer coil spring having its ends fixed to the knuckle and bearing members and an extensible inner coil spring located within the outer spring and between said knuckle and bearing members, said pilot bar preventing spring slap and keeping the knuckle and bearing members in alignment.

A still further object of the invention is to provide a simple and effective way of attaching the contractile spring to the bearing and knuckle members.

With the above and other objects in view, this invention consists of the details of construction and combination of elements hereinafter set forth and then designated by the claims.

In order that those skilled in the art to which this invention apertains may understand how to make and use the same, I will describe its construction in detail, referring by numerals to the accompanying drawing forming a part hereof, in which:

Fig. 1 is a side elevation of a tool embodying my invention.

Fig. 2 is a front end view of the same with the cover plate removed and a portion of the flexible connecting rod broken away.

Fig. 3 is a side elevation of a tool embodying my invention.

In carrying out my invention as herein embodied, 5 represents an electric motor of suitable size and shape having a head 6 which, for convenience of illustration, is shown as a disc. This head has two contiguous apertures 7 and 8 which are broken into each other so that they are in communication with each other and the motor shaft 9 projects into the center of the aperture 7 while a spindle 10 is mounted on said head in the center of the aperture 8.

A train of reduction gears is shown as comprising a small gear 11 fixed to the motor shaft 9 and located in the aperture 7, and a larger gear 12 on the spindle 10 and positioned within the aperture 8. These gears mesh with each other and the larger gear 12 carries a crank pin 13.

On the outer face of the head 6 is mounted a frame 14 including a yoke 15 and a barrel 16, said barrel having a longitudinal bore the entire length thereof and communicating with the chamber 17 formed by the yoke. The chamber 17 is closed by a removable cover plate 18, Fig. 1.

In the barrel 16 is reciprocatingly mounted a piston 19 having a head 20 fitted in the chamber 17 of the yoke 15 between the sides thereof which function as guides for said head. This head 20 has a socket 21 in which is rotatably mounted the circular knob 22 of the knuckle member 23, the latter also including a shank 24 having a spiral groove 25 on its exterior and an axial bore 26.

A bearing member 27, including a head 28 and stem 29 is journalled on the crank pin 13 and from the end of the stem projects a pilot bar 30 having its outer end reciprocatingly mounted in the bore 26 of the knuckle member 23. The stem 29 has a spiral groove formed thereon similar to the spiral groove 25 on the shank 24.

An outer contractile spring 32 has opposite ends attached to the bearing and knuckle members by screwing said ends onto the stem and shank, respectively, of the bearing and knuckle members, the spiral grooves being formed on the same pitch as the coils of the spring. An inner extensile spring 33 is located inside of the outer spring 32, preferably about the pilot bar, between the opposed ends of the bearing and knuckle members to urge said members in opposite directions. The inner extensile spring is only strong enough to barely open the coils of the outer contractile spring. Such an arrangement gives slightly more flexibility to the connecting rod, without attempting to accurately tension a spring of the contractile type.

A connecting rod constructed as described when used in a tool of the character mentioned, permits power and motion with substantially the same force as a solid connecting rod does, but there is a certain amount of resiliency in the blow at the instant of delivery which results in high grade work operations. The action of the connecting rod is such that there is a tendency to balance the operations of the tool and absorb shock incident to the piston striking the drill, hammer, or other implement 34 where shank is inserted in the outer end of the bore of the barrel.

In order that the tool may be readily manipulated and transported, a suitable handle 35 is provided and adjacent thereto is any desirable form of lever 36 to actuate an electric switch (not shown) for controlling the operations of the motor which is supplied with current through the usual conductor cord 37.

The device as a whole is relatively light in weight and because the barrel that holds the working implement projects radially from one end of the motor beyond the circumference thereof, application to the work is readily accomplished.

Of course I do not wish to be limited to the exact details of construction herein shown and described, as these may be varied within the scope of the appended claims without departing from the spirit of my invention.

Having described my invention, what I claim as new and useful is:

1. A connecting rod comprising two terminal members, each having a stem with a spiral groove and one of said members having an axial bore, a pilot bar formed with the other member and projecting from the stem thereof and extending into the bore of the first mentioned member and slidable therein, and a coil spring screwed into the spiral grooves.

2. The structure in claim 1 wherein the spring mentioned is of the contractile type, in combination with an extensile spring located within the contractile spring and engaging the opposed ends of the stems of the terminal members and urging said members away from each other.

3. In an electrically operated tool, a connecting rod for transmitting motion from a rotary element to a reciprocating element comprising, two terminal members each having a stem with a spiral groove and one of said members having an axial bore, a pilot bar extending from the stem of the other member and slidably mounted in said bore, a contractile coil spring having its ends screwed onto the grooved stems of said terminal members, the coils of said spring normally being very close together, and an extensile coil spring engaging the opposed stems of said terminal members to slightly urge them apart.

4. A connecting rod comprising a pair of terminal members, a contractile spring having its ends fixed to said members, an extensile spring within the first mentioned spring and engaging said members, and a pilot bar carried by one of the terminal members and projecting into a bore in the other terminal member for sliding movements.

ABRAM H. BITNER.